May 5, 1964   P. A. MUELLER   3,131,943
ROTARY MECHANICAL SEAL
Filed May 24, 1961   2 Sheets-Sheet 1

INVENTOR:
PETER A. MUELLER
BY Norman Gerlach
ATT'Y

May 5, 1964 P. A. MUELLER 3,131,943
ROTARY MECHANICAL SEAL
Filed May 24, 1961 2 Sheets-Sheet 2

FIG. 3ª

INVENTOR:
PETER A. MUELLER
BY
Norman F Gerlach
ATT'Y

United States Patent Office 3,131,943
Patented May 5, 1964

3,131,943
ROTARY MECHANICAL SEAL
Peter A. Mueller, Oak Park, Ill., assignor to Mueller Seal Company, a corporation of Delaware
Filed May 24, 1961, Ser. No. 112,451
3 Claims. (Cl. 277—90)

The present invention relates to improvements in rotary mechanical seals of the type which effects a seal against the passage of fluid between relatively movable machine parts as, for example, a shaft and a casing within which the shaft is rotatably mounted. Still more specifically, the invention relates to that type of mechanical seal in which the sealing effect between the relatively moving parts occurs at radially extending surfaces and a so-called running seal is provided between the moving parts.

The running surfaces in associated relation with a rotary mechanical seal of the type briefly outlined above are usually provided on a pair of opposed sealing elements, one of which is commonly known as the seal "seat" and the other of which is commonly termed the sealing "washer." Usually, one of these elements is maintained stationary with respect to the casing to which it is effectively sealed, while the other element is caused to rotate with the shaft to which it likewise is effectively sealed. Sometimes the seat is press-fitted within the opening in the casing through which the shaft extends, but more often than not, the seat is carried on the shaft and rotates therewith, while the washer, which has a running fit or engagement with the seat, forms a part of a washer assembly by means of which it is sealed to the wall of the opening and is thus maintained stationary except for its ability to shift axially to compensate for combined washer and seat wear. Such axial shifting seldom exceeds a few thousandths of an inch during the life of the seal. The present invention is concerned primarily with a novel form of washer assembly by means of which the washer proper of the rotary mechanical seal with which the assembly is employed is effectively sealed to the wall of a liquid-containing pump chamber, tank or the like, and through which opening a rotary shaft extends.

Present-day washer assemblies almost invariably are comprised of four principal functional parts, namely, a washer proper, a spring for urging the washer forwardly against the seat with the proper degree of pressure to exclude passage of fluid radially past the running seal faces but not with such extreme pressure as to shut out the necessary amount of fluid for lubrication and anti-squeal purposes, a bellows of elastomeric material for sealing the washer to the wall of the pump or other housing, and a retainer, usually of brass, for maintaining the washer, spring and bellows in their operative positions. The retainer is adapted to be press-fitted into the shaft opening or, alternatively, into a recess in the pump housing surrounding the opening. In my copending United States patent application Serial No. 87,317, filed on February 6, 1961, and entitled "Rotary Mechanical Seal," there is disclosed a washer assembly wherein the spring and bellows combination has been eliminated and in its stead there is substituted a single metal element in the form of an imperforate resilient ring of frusto-conical design, the ring serving the dual function of yieldingly urging the washer forwardly against the seat and of sealing the washer to the cylindrical wall of the opening through which the rotating shaft extends. It is to such a seal that the present invention relates and the seal disclosed herein is designed as an improvement over the particular rotary mechanical seal of my copending application.

It is a general object of the present invention to provide novel means for establishing a driving connection between the resilient frusto-conical sealing ring and the washer proper and by means of which connection the washer and ring are held against relative rotation. In the case of a seal wherein the seat is stationary and the washer rotates, the connection is truly a driving connection in that the washer is positively rotated due to the motion transmitted to it by the ring. In the case of a seal, such as has been illustrated herein, wherein the seat rotates and the washer remains stationary, the stationary ring maintains the washer against rotation under the influence of frictional forces developed by the rotating seat. Connections of this sort are commonly referred to in the seal art as driving connections even though neither part rotates, and such terminology has been adhered to in the present instance.

It is a specific object of this invention to provide in connection with a rotary mechanical seal a driving connection which extends between the ring and washer and is completely devoid of interfitting or interlocking radially offset parts, such as interengaging lugs and recesses, ribs and grooves, fingers and sockets, and other such interengaging means commonly employed as a driving connection between a washer and its associated bellows, spring retainer or other seal part. By such an arrangement, both the washer and the sealing ring may be of truly cylindrical design, i.e., circular in transverse cross section, at any point axially therealong, thus contributing toward economy of manufacture due to simplification in the molding, stamping or other procedures which may be employed in constructing the seal parts.

Another part of the invention is to provide in a seal of the character briefly outlined above, a driving connection between the washer and the sealing ring wherein the two parts are assembled upon each other by a reinforced pressed-fit which is not only frictionally able to withstand the counter-torque exerted by the relatively moving seal seat but also is fluid tight so that there will be no passage of fluid between the ring and washer.

A still further object of the invention is to provide in a rotary mechanical seal of the type under consideration, a driving connection embodying a pressed-fit between the ring and washer and employing a compression ring for reinforcing the pressed-fit, the compression ring being disposed a sufficient distance rearwardly of the running seal faces that maximum wear of the washer may take place, thus insuring long seal life.

With these and other objects in view, which will become readily apparent as the nature of the invention is better understood, the invention consists in the novel construction, combination and arrangement of parts shown in the accompanying single sheet of drawings forming a part of this specification.

In these drawings:

FIG. 3a is a fragmentary enlarged detail view of a portion of the structure shown in FIG. 3.

Figure 1:
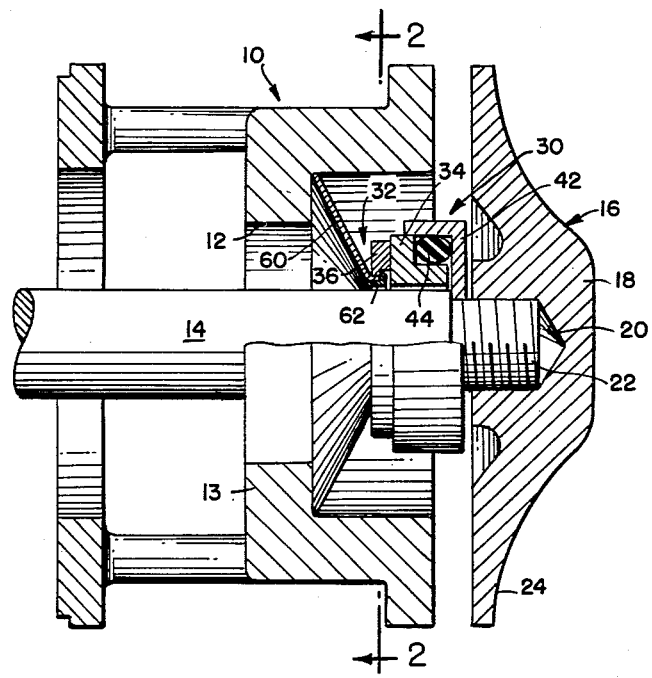
FIG. 1 is a fragmentary sectional view, with parts in elevation, taken substantially centrally and longitudinally through a pump assembly and showing one form of rotary mechanical seal assembly embodying the invention operatively installed therein.
Figure 2:
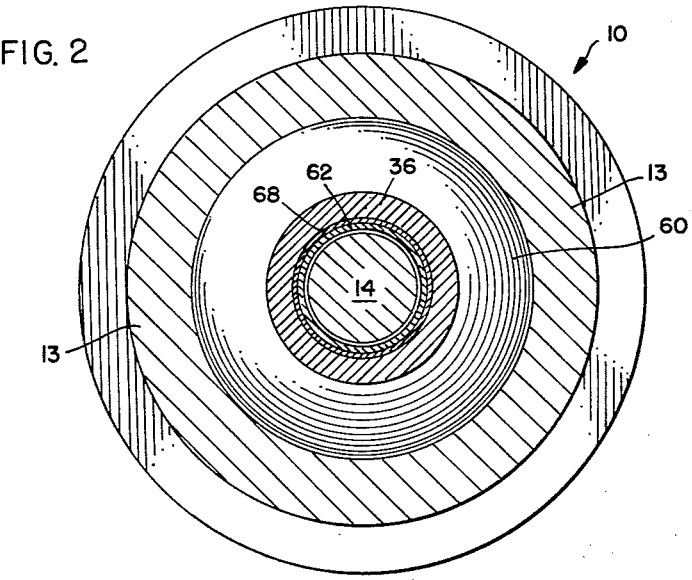
FIG. 2 is a fragmentary sectional view taken on the line 2—2 of FIG. 1.
Figure 3:
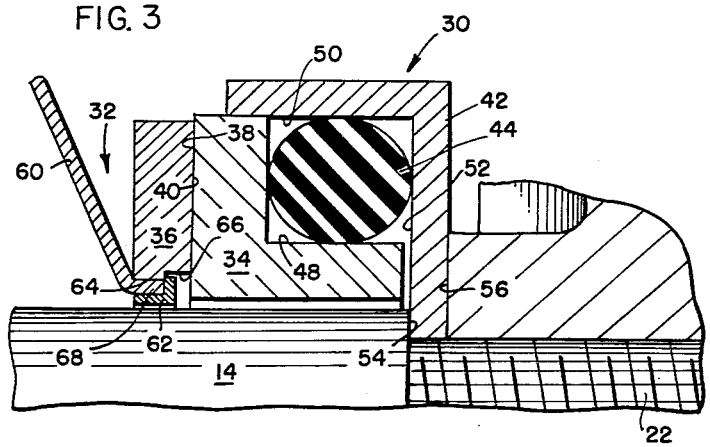
FIG. 3 is an enlarged fragmentary detail view of a portion of the structure shown in FIG. 1.

Referring now to the drawings in detail, and in particular to FIGS. 1 to 3 inclusive, the structure selected for illustration in these views as a typical environment for the improved rotary mechanical seal of the present invention may be assumed to be a centrifugal, impeller-type automotive water pump, including a housing 10 having a central opening 12 in one wall 13 thereof and through which opening the usual impeller drive shaft 14 extends. The shaft 14 is rotatably mounted in suitable bearings (not shown) and carries at its outer end an impeller 16. The latter includes a central hub 18 having a threaded socket 20 threadedly received on a reduced end portion 22 of the shaft 14. A series of impeller blades 24 extends radially outwardly from the hub 18.

The seal assembly by means of which the opening 12 is sealed against passage of liquid therethrough comprises two principal parts or assemblies, namely, a seat assembly 30 and a retainer, ring and washer assembly 32. The seat assembly 30 includes a seal seat proper 34 (hereinafter referred to as the seat), while the washer assembly 32 includes a washer proper 36 (hereinafter referred to as the washer). The seat and washer are provided with flat annular seal faces 38 and 40, respectively, and they are designed for running contact with each other in the usual manner of operation of rotary mechanical seals of the general type disclosed herein.

The seal seat assembly 30 per se forms no part of the present invention except insofar as its cooperation with the washer assembly 32 is concerned and no claim is made herein to any novelty associated with it. The present invention resides rather in the novel construction and arrangement of parts of the washer assembly 32 which will be described in detail presently.

The seat assembly 30 selected for illustration herein involves in its general organization an outer cylindrical cup-shaped retainer 42 (see FIG. 3), the previously mentioned seat proper 34, and a resilient O-ring 44 of elastomeric material. The seat 34 is recessed as at 46 to accommodate the O-ring 44, and the seat and O-ring assembly are telescopically received within the cup-shaped retainer 42 in such manner that the O-ring bears against the cylindrical wall 50 and the radial wall 52 of the retainer and serves to center the seat 34 within the assembly. The inner peripheral region of the radial wall 52 is clamped between the shoulder 54 which exists at the base of the threaded portion of the shaft 14 and the inner end face 56 of the impeller 16, thus constraining the entire seat assembly 30 to rotate bodily with the shaft. The seat assembly 30 just described is purely exemplary and other forms of seat assemblies offering flat annular radial seat faces, such as the face 38, may be substituted if desired.

The ring and washer assembly 32 which forms the subject matter of the present invention is comprised of three parts, the previously mentioned washer 36, a metallic imperforate frusto-conical backing ring 60 of large slant angle and small slant height, and an inner compression ring 62.

The washer 36 is in the form of a circular ring which surrounds the shaft 14 and presents its running seal face 40 to the opposed seal face 38 of the seat. The washer is formed with a central opening or bore 64 which extends completely therethrough and has a portion or counterbore 66 of enlarged diameter. The washer 36 may be formed of any one of a number of materials which are commonly employed in the manufacture of seal washers and among these are close-grained cast iron, brass, stainless steel, or a non-corrosive material, such as "Teflon," or a ceramic material, where the assembly 32 is to be employed in connection with the pumping of caustic liquids, acids or the like. One material which has been found particularly useful in the manufacture of automotive seals is a synthetic thermosetting resin containing a powdered metal alloy of lead, antimony and tin. The two running seal surfaces 38 and 40 are lapped flat so as to prevent egress or ingress of fluid in either direction radially across these running seal faces. The material of the seat 34 is, in automotive pumps, usually cast iron, but other materials are in use, for example, ceramic materials where caustic fluids are undergoing pumping.

The washer 36 is adapted to be yieldingly pressed forwardly against the seat 34 by means of the previously mentioned ring 60 and, according to the present invention, novel means are provided for sealing the forward end of the ring to the washer and for preventing relative turning movement between these parts. As best seen in FIGS. 1 and 3, the rim region of the small base of the generally frusto-conical ring 60, which hereinafter will be referred to as a backing ring for the washer, is turned forwardly as at 68 to provide a cylindrical portion or wall which is press-fitted within the bore 64 of the washer 36.

The material of the backing ring 60 is relatively thin and it is preferably formed of stainless spring steel. In order to reinforce or enhance the character of the press-fit between the cylindrical portion 68 of the backing ring and the washer 36, the compression ring 62 is provided. This compression ring is L-shaped in radial cross section and it includes a short cylindrical section 70 and a radial flange 72. The cylindrical section 70 extends within the forwardly extending cylindrical portion 68 of the backing ring 60 with a tight fit and serves to expand the cylindrical portion 68 radially outwardly against the face of the cylindrical bore 64, while the radial flange 72 abuts against the forward rim 74 of the cylindrical portion 68 and is disposed in the counterbore 66, as best seen in FIG. 3a. When in position against the cylindrical portion 68 of the backing ring 60, the forward face 76 of the radial flange 72 of the compression ring 62 lies in a vertical plane which is disposed an appreciable distance rearwardly of the seal face 38. Stated in other words, the washer 36 projects forwardly of the compression ring 62 and presents an appreciable thickness of material between the respective radial planes of the seal face 38 and of the forward face 76 of the compression ring 62, such thickness of material being subject to wear before the useful life of the seal as a whole has been expended.

Figure 4:
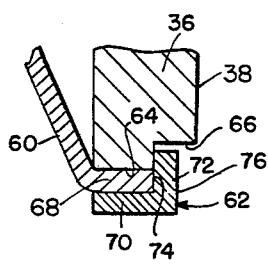
FIG. 4 is a fragmentary quarter sectional view taken substantially centrally and vertically through a modified form of seal assembly, showing the same operatively installed in an agitator tank.
Figure 4:
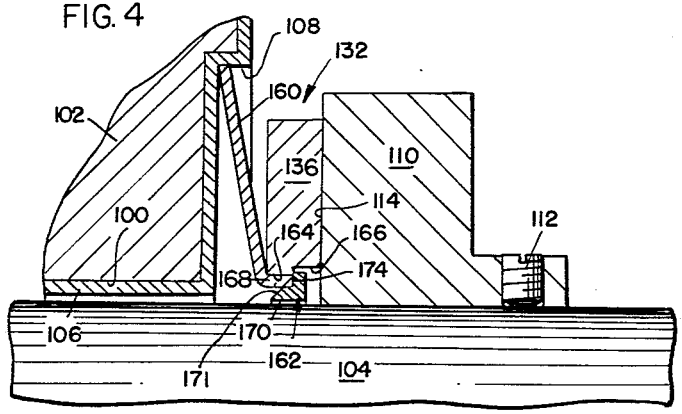

In FIG. 4, a slightly modified form of the invention has been illustrated. For exemplary purposes, the seal assembly has been shown in a different environment from the seal assembly of FIG. 1. Specifically, it is shown as being installed in a caustic tank where an opening 100 in the wall 102 of the tank receives therethrough a rotary pump shaft 104. A non-corrosive lining 106 follows the inside contour of the wall. The opening 100 is surrounded by a cylindrical recess 108. The seal assembly includes a seal seat 110 which rotates with the shaft 104 and may be fixedly secured to the latter by a set screw 112. The seat may be of any suitable non-corrosive material, as for example, a ceramic material, and it presents a rearwardly running seal face 114. The washer assembly 132 is similar to the washer assembly 32 previously described in connection with the form of the invention shown in FIGS. 1 to 3, inclusive, and, therefore, in order to avoid needless repetition of description, similar reference numerals, but of a higher order, have been employed to designate the corresponding parts as shown between the disclosures of FIGS. 3 and 4.

The backing ring 160 and washer 136 remain precisely the same as in the form of the invention previously described except that the washer is preferably made of a material which will withstand the attack of corrosive materials. The compression ring 162, however, is slightly modified. This ring is provided with a short cylindrical section 170, the rear rim portion of which is bevelled as indicated at 171 on the outer side thereof, the purpose of the bevel being to guide the compression ring as a whole over the forwardly extending cylindrical portion 168 of the backing ring 160 when the initial press-fit is effected between the compression ring and backing ring at the time the seal is assembled. This bevelled surface 171 is without function in the operation of the seal assembly of FIG. 4, which otherwise remains substantially the same as the operation of the seal assembly shown in FIGS. 1 to 3 inclusive, its sole function being one of facility of seal assembly. In the event that, due to manufacturing tolerances, the inside diameter of the forwardly extending portion 168 of the backing ring 160 is of such extent that difficulty would ordinarily be encountered in telescopically pressing the compression ring thereover, the bevelled surface 171 will function as a guide for the compression ring and, by effecting a camming action on the forward rim 174 of the cylindrical portion 168, it will serve to expand this portion to enable the necessary telescopic relationship to be attained, while at the same time the cylindrical portion 168 will be expanded into firm frictional contact with the inside face of the central opening 164 of the washer 136.

While there have been shown and described the fundamental novel features of the invention as applied to two preferred embodiments thereof, it will be understood that various omissions, substitutions and changes in the form and details of the seal illustrated herein, and in its operation, may be made by those skilled in the art, without departing from the spirit or scope of the invention. It is the intention, therefore, to be limited only as indicated by the scope of the following claims.

Having thus described the invention what I claim as new and desire to secure by Letters Patent is:

1. The combination with a pair of relatively rotatable members consisting of a housing member having an opening therethrough and a shaft member extending loosely through and concentric with said opening, together with means on one of the members forming an annular recess in concentric relation with the shaft member, and means on the other member providing a sealed radial face in concentric relation with the axis of the shaft member and spaced axially a small distance from the recess, of a rotary mechanical seal operative to provide a fluid seal for the space between the two members and comprising an anti-friction washer extending concentrically around the shaft member, having extending therethrough an axial truly cylindrical bore of greater diameter than said shaft member, having one end face thereof flat and in abutment and running sealing engagement with said sealed radial face, and also having a truly cylindrical counterbore extending inwards from said one end face thereof and terminating in a flat radial shoulder in spaced relation with the other end face of the washer and at right angles to the axis of said washer, an imperforate, single thickness, frusto-conical backing ring having a small slant angle and short slant height, formed of thin spring metal, extending concentrically around the shaft member and between the annular seat and washer, having one end thereof disposed in tight sealing engagement with said annular recess and held against axial and rotative shifting with respect to said one member, and having its other end provided with an integral outwardly extending truly cylindrical rim portion that is telescopically received in the bore of the washer with a tight frictional fit and terminates short of the counterbore, said backing ring presenting a substantially straight radial cross section from one end thereof to the other at substantially all radial angles and being under endwise compression to the end that it serves to urge the washer yieldingly against the aforesaid sealed radial face on said other member, and a rigid compression ring of L-shaped cross section, extending loosely around the shaft member, positioned between the washer and said other end of the backing ring and embodying a cylindrical portion that is telescopically received within the cylindrical rim portion of the backing ring and serves to expand said cylindrical rim portion uniformly against said cylindrical bore of the washer, said compression ring also embodying an outwardly extending flat radial flange which extends outwards across the free end of said cylindrical rim portion of the backing member and fits flatly and directly against the aforesaid flat radial shoulder of the washer, said washer being so proportioned that the length of its counterbore is substantially greater than the thickness of the radial flange of the compression ring to the end that its said one end face is axially spaced from the outer side face of said radial flange of the washer.

2. A rotary mechanical seal as set forth in claim 1 and wherein the free end edge of the cylindrical portion of the compression ring is provided with an external bevelled surface in order to facilitate telescopic reception of the cylindrical rim portion of the backing ring within the cylindrical portion of the compression ring.

3. The combination with a pair of relatively rotatable members consisting of a housing member having an opening therethrough, and a shaft member extending loosely through and concentric with said opening, together with means on one of the members forming an annular recess in concentric relation with the shaft member, and means on the other member providing a sealed radial face in concentric relation with the axis of the shaft member and spaced axially a small distance from the recess, of a rotary mechanical seal operative to provide a fluid seal for the space between the two members and comprising an anti-friction washer extending loosely and concentrically around the shaft member, having one end face thereof flat and in abutment and running sealing engagement with said sealed radial face, having a first concentric truly cylindrical surface extending inwards from its other end face, having a second concentric truly cylindrical surface of different diameter than the first cylindrical surface extending inwards from its one end face, and having a flat radial shoulder between the inner ends of its first and second cylindrical surfaces and at right angles to the axis of the washer, an imperforate, single thickness, frusto-conical backing ring having a small slant angle and short slant height, formed of thin spring metal, extending concentrically around the shaft member and between the annular seat and the washer, having one end thereof disposed in tight sealing engagement with said annular recess and held against axial and rotative shifting with respect to said one member, and having its other end provided with an integral outwardly extending truly cylindrical rim portion that extends telescopically around the first cylindrical surface with a tight frictional fit and terminates short of the second cylindrical surface, said backing ring presenting a substantially straight radial cross section from one end thereof to the other at substantially all radial angles and being under endwise compression to the end that it serves to urge the washer yieldingly against the aforesaid sealed radial face on said other member, and a rigid compression ring of L-shaped cross section, extending loosely around the shaft member, positioned between the washer and said other end of the backing ring and embodying a cylindrical portion that extends around the cylindrical rim portion of the backing ring and serves to press said cylindrical rim portion uniformly against said first cylindrical surface of the washer, said compression ring also embodying a flat radial flange which extends across the free end of said cylindrical rim portion of the backing member and fits flatly and directly against the aforesaid flat radial shoulder of the washer, said washer being so proportioned that the length of its second cylindrical surface is substantially greater than the thickness of the radial flange of the compression ring to the end that its said one end face is axially spaced from the outer side face of said radial flange of the washer.

References Cited in the file of this patent

UNITED STATES PATENTS

| 2,299,590 | Reynolds | Oct. 20, 1942 |
| 2,695,801 | Kosatka | Nov. 30, 1954 |
| 2,941,825 | Heinrich | June 21, 1960 |

FOREIGN PATENTS

| 752,266 | Great Britain | July 11, 1956 |